United States Patent [19]

Bagne

[11] 4,061,352

[45] Dec. 6, 1977

[54] MUD GUARD

[75] Inventor: Gordon Bagne, Santa Ana, Calif.

[73] Assignee: Plasticolor Molded Products, Inc., Placentia, Calif.

[21] Appl. No.: 714,612

[22] Filed: Aug. 16, 1976

[51] Int. Cl.² .................................................. B62D 25/16
[52] U.S. Cl. ............................. 280/154.5 R; 428/31;
  428/80; 428/81; 428/137; 428/156
[58] Field of Search ............... 280/154.5 R, 154.5 A;
  428/31, 80, 81, 74, 76, 137, 156, 170, 171, 172,
  164, 187, 203, 157

[56] References Cited

U.S. PATENT DOCUMENTS

| 3,237,963 | 3/1966 | Menzer | 280/154.5 R |
| 3,322,609 | 3/1967 | Vida | 428/156 |
| 3,497,238 | 2/1970 | Carlton | 280/154.5 R |
| 3,582,108 | 6/1971 | Carlton | 280/154.5 R |
| 4,012,053 | 3/1977 | Bode | 280/154.5 R |

Primary Examiner—William J. Van Balen
Attorney, Agent, or Firm—Jackson & Jones

[57] ABSTRACT

A mud guard constructed of a fiberglass mat embedded in cured liquid plastic body, the body having a decorative, multicolored design of cured liquid plastic material molded thereto. The mud guard is formed in a mold by first pregelling the liquid plastic material comprising the design in a recessed design pattern, applying a liquid plastic body layer over the pregelled design and allowing a fiberglass mat to soak into the body layer. The mold contents are then baked to form a final article.

7 Claims, 3 Drawing Figures

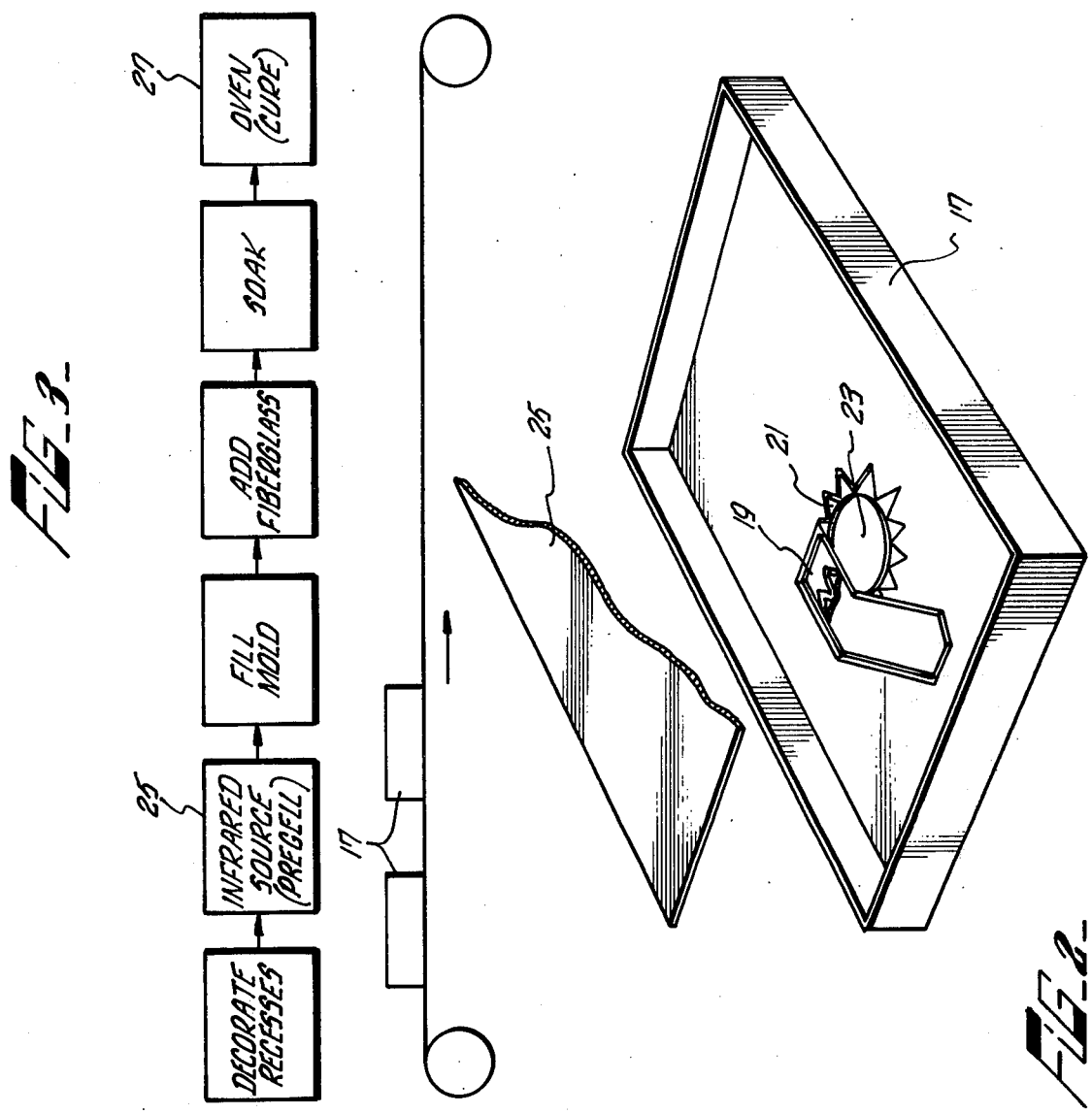
FIG_3.
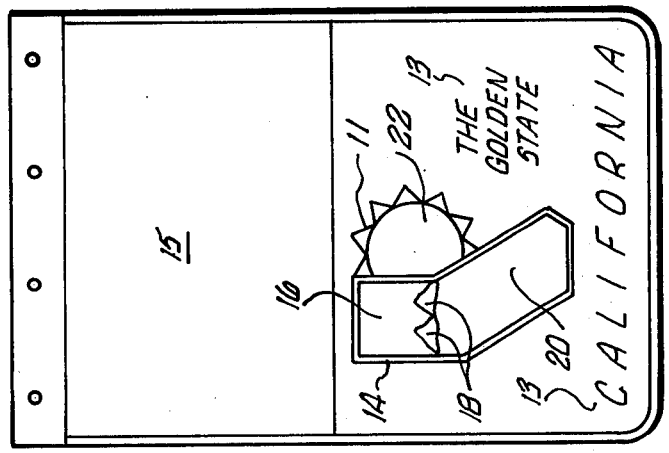
FIG_2.
FIG_1.

MUD GUARD

BACKGROUND OF THE INVENTION

The subject invention relates to mud guards and more particularly to a flexible mud guard exhibiting superior strength and wear characteristics and having colorful ornamentation formed as an integral part thereof.

Prior art flexible mud guards have been made by compression molding solid rubber or plastic materials or by extruding plastic slurries. Some such mud guards have had painted-on lettering. Such mud guards have been susceptible to destruction by tearing and impacts. Moreover, the design or lettering has been relatively simple and bland in appearance and can wear, wash, or peel off.

SUMMARY OF THE INVENTION

It is therefore an object of the invention to provide a mud guard having improved wear characteristics.

It is another object of the invention to provide a mud guard having improved ornamentation structure.

It is yet another object of the invention to provide a practical procedure for manufacturing such a mud guard with improved wear and ornamentation features.

These and other objects and advantages of the invention are accomplished by forming a mud guard in a mold having recesses which form a decorative design. The recesses are first filled with liquid plastic, which is then partially cured. After the partial curing, a second liquid plastic material is used to fill the entire mold, covering the partially cured plastic design. To give strength to the mud guard, reinforcing material is placed on the top surface of the second liquid plastic material and allowed to soak into the mold. Thereafter the entire mold is heated to cure the liquid plastic materials and the reinforcing materials into a solid article.

BRIEF DESCRIPTION OF THE DRAWINGS

The preferred embodiment for practicing the just summarized invention will now be discussed in detail in conjunction with the drawings of which:

FIG. 1 illustrates the mud guard of the preferred embodiment of the invention.

FIG. 2 illustrates apparatus used in forming a mud guard according to the preferred embodiment of the invention.

FIG. 3 illustrates the procedure for forming a mud guard according to the preferred embodiment of the invention.

DETAILED DESCRIPTION OF THE PREFERRED EMBODIMENT OF THE INVENTION

FIG. 1 illustrates a mud guard configured according to the preferred embodiment of the invention. The face of the mud guard 15 has formed therewith a raised design 11 and raised lettering 13. The design 11 may be quite intricate and the various parts thereof may be variously colored. For example, as illustrated, the state of California may be outlined by a single line 14 with individually colored interior sections 16, 18, 20. The interior sections and additional exterior sections may illustrate features characteristic of the state, such as mountain peaks 18 and sunshine 22. By appropriately coloring various portions, a colorful and highly attractive design results.

The body of the mud guard 15 contains a fiberglass membrane, which provides the mud guard with high tear and impact resistance, low temperature resistance and anti-sail characteristics. According to the construction of the preferred embodiment of the invention, the membrane is added such that the face of the mud guard 15 is smooth and the lettering 13 and design 11 are undistorted. While the face of the mud guard presents a smooth and clean surface, the fiberglass membrane fibers are typically visible from the rear.

FIG. 2 illustrates a mold structure which may be used to construct the mud guard of the preferred embodiment of the invention. The mold 17 is preferably constructed of metal and has recesses, for example 19, 21 and 23, therein forming the design desired to be depicted on the front of the mud guard. Additionally, a fiberglass membrane 25 is cut rectangularly to fit easily inside of the mold 17.

Fabrication of the mud guard 15 is carried out according to the process illustrated in FIG. 3. First, the recesses such as 19, 21 and 23 are filled with variously colored liquid plastic materials. The material used in the preferred embodiment is commercially available PVC plastisol. Other liquid plastic materials such as Urethanes would also be suitable.

The partially-filled mold 17 is then passed to an infra-red source 25 which is used to pregel but not entirely cure the variously colored liquid plastic materials in the recesses 19, 21, and 23. Using plastisol, the pregel is accomplished in 1½–2 minutes under a 250° source, for example.

After a suitable time under the infra-red source 25, the rest of the mold is filled with a background liquid plastic material. This background material forms the mud guard body and consists of black plastisol in the preferred embodiment. Again, other types and colors of liquid plastic could be used.

Next the fiberglass mat 25 is added to the filled mold 17 and allowed a soaking period of around 1 minute during which the mat sinks near the bottom of the mold 17. This soaking step is important to the final mud guard appearance in that it prevents disfigurement of the mud guard face and design which would occur if the fiberglass mat were to be merely placed in the mold before the background liquid plastic is added. While fiberglass is the preferred material, other materials which are capable of soaking in such as cloth or screen meshes might be employed.

After addition of the reinforcing mat, the mold 17 is passed through an oven 27 where its entire contents are finally cured into a final mud guard article. This curing may be accomplished in 6½ minutes at 350°. During this final curing, the pregelled design in the recesses such as 19, 21, and 23 fuses the background material.

The entire process described above may be carried out on a conveyor belt. In such a process, successive molds are decorated and placed on the belt, passed to an infra-red source, filled with background plastic material and fiberglass and passed through a curing oven.

The mud guard constructed according to the preferred embodiment of the invention exhibits a highly colorful and decorative design of superior wear resistance and intricacy as compared to the prior art. The liquid plastic material in combination with a fiberglass mat in turn provides an entire mud guard body exhibiting superior wear resistance properties.

As may be appreciated, many modifications may be made to the just discussed preferred embodiment without departing from the scope and spirit of the invention. Therefore, it is to be understood that, within the scope of the appended claims, the invention may be practiced other than as specifically described.

What is claimed is:

1. A mud guard comprising:
   a body of first plastic material;
   a reinforcing material embedded in said body such that said first plastic material forms a thin skin coat providing a smooth face to said body; and
   a raised design of a second plastic material molded with the body of said mud guard.

2. The mud guard of claim 1 wherein said first and second plastic materials are cured liquid plastic and wherein said reinforcing material is a fiberglass mat.

3. The mud guard of claim 1 wherein said design comprises sections of cured liquid plastic material, each of said sections of cured liquid plastic being selectively colored.

4. A mud guard comprising:
   a body of a first colored plastic material;
   a reinforcing material embedded in said body;
   a plurality of sections of plastic material raised from said body and molded with said body.

5. The mud guard of claim 4 wherein said body forms a smooth skin coat over said reinforcing material.

6. The mud guard of claim 4 wherein at least one of said sections contain a plastic material of color different from said body.

7. The mud guard of claim 6 wherein said sections comprise a multicolored decorative design.

* * * * *